(12) United States Patent
Douglas

(10) Patent No.: US 8,482,909 B2
(45) Date of Patent: Jul. 9, 2013

(54) FLEXIBLE DISPLAY BAND WITH REMOVABLE CONTROL UNIT

(76) Inventor: Vincent Douglas, Hampshire (GB)

( * ) Notice: Subject to any disclaimer, the term of this patent is extended or adjusted under 35 U.S.C. 154(b) by 332 days.

(21) Appl. No.: 12/426,451

(22) Filed: Apr. 20, 2009

(65) Prior Publication Data
US 2009/0251888 A1 Oct. 8, 2009

Related U.S. Application Data

(63) Continuation of application No. 10/544,245, filed as application No. PCT/GB2004/000468 on Feb. 6, 2004, now abandoned.

(51) Int. Cl.
*H05K 5/00* (2006.01)
*H05K 7/00* (2006.01)

(52) U.S. Cl.
USPC .......... 361/679.03; 63/11; 362/104; 362/103; 368/282

(58) Field of Classification Search
USPC .......... 362/103–105; 63/11, 40; 368/281–282
See application file for complete search history.

(56) References Cited

U.S. PATENT DOCUMENTS

| | | | | |
|---|---|---|---|---|
| 4,060,185 A | * | 11/1977 | Kuroda | 224/176 |
| 4,130,987 A | * | 12/1978 | Schickedanz | 368/29 |
| 5,857,217 A | * | 1/1999 | Hsueh | 2/170 |
| 5,931,764 A | * | 8/1999 | Freeman et al. | 482/4 |
| 6,433,483 B1 | * | 8/2002 | Michael et al. | 315/76 |
| 6,619,835 B2 | * | 9/2003 | Kita | 368/281 |
| 7,441,415 B2 | * | 10/2008 | Radley-Smith | 63/3 |

FOREIGN PATENT DOCUMENTS

| | | | |
|---|---|---|---|
| GB | 2258134 A | * | 2/1993 |
| GB | 2373990 A | * | 10/2002 |
| JP | 60-165572 | | 8/1985 |
| JP | 3051524 U | | 8/1998 |
| JP | 2001-186908 | | 7/2001 |
| JP | 3093429 U | | 5/2003 |
| WO | WO 0059327 A1 | * | 10/2000 |

* cited by examiner

*Primary Examiner* — Robert May
(74) *Attorney, Agent, or Firm* — King & Schickli, PLLC

(57) ABSTRACT

A display apparatus (10) comprises a display band (14) and a control unit (12). The display band (14) is flexible and is dimension for wrapping round the wrist or other part of the user. In preferred forms, the control unit (12) includes a timing circuit and the display band (14) includes a digital time display, the apparatus thus functioning as a watch. Also preferred is the use of a malleable display band (14) allowing the apparatus to be applied to the wrist or the like without use of a buckle or catch. A variety of display bands (14) may be used interchangeably with a single control unit.

32 Claims, 4 Drawing Sheets

FLEXIBLE DISPLAY BAND WITH REMOVABLE CONTROL UNIT

This application is a continuation of Ser. No. 10/544,245, which is the national stage of international application PCT/GB2004/000468.

TECHNICAL FIELD OF THE INVENTION

The present invention relates to display apparatus, particularly, but not exclusively, display apparatus which is used as personal jewellery or wrist watches.

BACKGROUND OF THE INVENTION

Most people own a wristwatch and they can be found in a number of guises to suit personal taste and disposable income. They all have the same basic features, however, of a central section which provides the time and display (be it analogue or digital) and also contains the watch's mechanism, a strap or bracelet which surrounds the wearer's wrist and a clasp or buckle to secure the whole arrangement to the wearer's wrist.

SUMMARY OF THE INVENTION

The present invention is directed to a display apparatus for personal wear. The present invention provides a display apparatus comprising a flexible display member and a control unit provided at one end of the display member, the display member being in the form of a strip of a size suitable to be positioned around a limb of a user.

In one form of the invention, the display member is malleable, the malleable display member preferably being sufficiently stiff as to retain its shape without the need for a latch or other retainer. This allows a given product to fit a wide range of users, and makes the product easier to use.

The term "malleable" is used herein to mean capable of being shaped or moulded by the application of hand pressure to a shape which is retained until the shape is again altered by hand pressure. One form of malleable member contemplated in this invention is a strip or band of thin metal or plastic and which is initially axially straight and transversely concave. An alternative is to use a strip or band of a low yield point, such as a soft alloy.

The display member may comprise an electro-luminescent display bonded to a malleable strip; and in a preferred form the display member comprises a rubber backing, a strip of thin steel forming said malleable strip, said electro-luminescent display, a filter layer, and an anti-moisture covering.

In an alternative form of the invention, the apparatus can be secured by a buckle or clasp. In either form, controls are preferably provided on the display member, most suitably in the form of touch-sensitive areas on the display. This simplifies construction, and makes it easier to seal the apparatus against water.

The control unit preferably comprises a timing circuit and the display member is adapted to display time indicia, whereby the apparatus functions as a watch. Additionally, or alternatively, the control unit may comprise means for generating visual patterns on the display member, whereby the apparatus functions as an electronic bracelet.

Preferably also, the display member is removably attached to the control unit, whereby the display member can be detached and replaced with an alternative design or size to suit the individual. Thus, the apparatus can readily be adapted to different styles and appearances according to the desires of the user and his/her social milieu at a given time.

BRIEF DESCRIPTION OF THE DRAWINGS

An embodiment of the present invention will now be described, by way of example only, with reference to the accompanying drawings in which.

DETAILED DESCRIPTION OF THE PREFERRED EMBODIMENTS OF THE INVENTION

Figure 1:
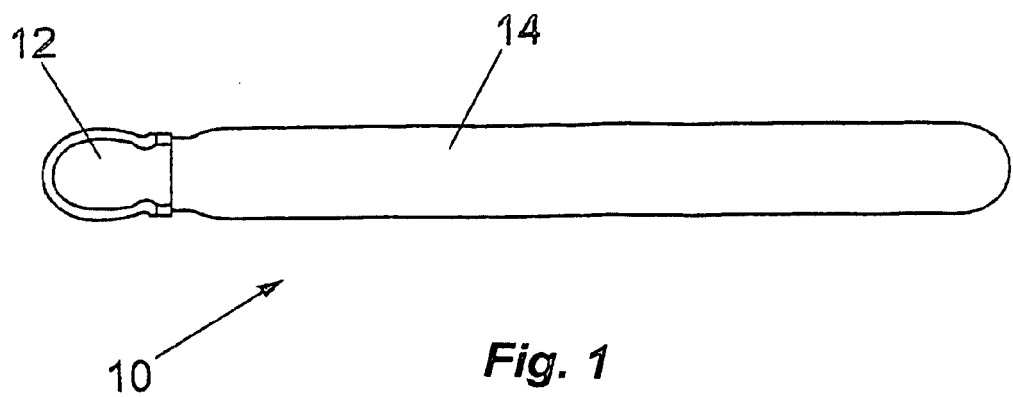
FIG. 1 is a front view of the display apparatus.

Referring to the drawings and initially to FIG. 1 there is shown a watch according to the present invention generally referred to as 10. The watch 10 comprises two main elements, a control unit 12 and a malleable display band or sprung band 14. The control unit 12 and the sprung band 14 are not permanently connected and can be readily interchanged.

The control unit 12 contains all of the required mechanisms and the power source for the watch. It consists of a rear cover 26 and a top cover 28 which clip securely together and house a battery 12a and electronics 12b.

Figure 3:
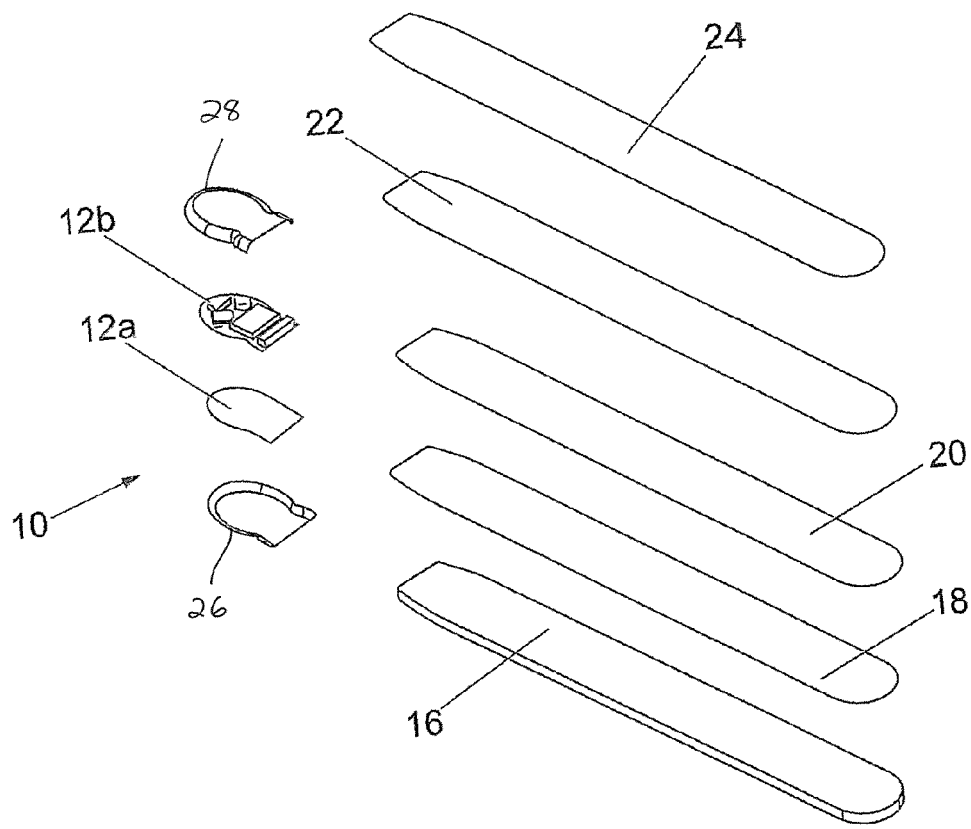
FIG. 3 is a perspective view of the apparatus of FIG. 1 showing the details of the construction of the apparatus.

In this case the watch uses a standard quartz circuit and an ordinary watch battery. The sprung band 14 is constructed from several layers which are shown in greater detail in FIG. 3. and which are held together by double-sided LSE clear 3M adhesive between adjacent layers. As can be appreciated, the band 14 may be removably attached to the control unit 12 by a male/female connector arrangement without the use of a screw, such that the band 14 can be detached from the control unit 12 in an easy manner and replaced with an alternative design or size display member to suit the user. Specifically, the male portion comprises one end of the display member formed by band 14, such as a tongue, while the female portion comprises a recess formed by the concurrence of an upper housing portion and a lower housing portion of the control unit, and adapted for receiving the tongue longitudinally in a sliding fashion, as shown. The arrangement thus forms a sleeve for receiving the male portion (tongue) and securing it in place.

The bottom layer 16 is a 500 pm thick natural rubber section. Above that is a layer 18 composed of a 50 pm plastic coated hardened and tempered steel. Above that is a 100 pm thick electro-luminescent display layer 20 on top of which is a 50 pm polyester deep dyed filter layer 22. Finally, there is a 100 pm anti-moisture ingress coating 24. All five layers form a composite sandwich to make up the sprung band 14.

Figure 3A:
FIG. 3a is a cross-section of part of FIG. 3 to an enlarged scale.

The steel layer 18 has the transverse shape shown in FIG. 3a, that is curved in a gentle arc, when the sprung band 14 extends in a straight path. When the apparatus is applied to the wrist and wrapped around it, the transverse curve straightens out and the tension in the layer 18 acts to maintain the band in its wrapped condition until peeled off.

The four layers apart from the electroluminescent layer 20 terminate first inside the control unit 12. The electroluminescent layer 20 continues further into the control unit 12 and adopts its shape. The layer 20 has a beryllium-copper surfacemounted connector similar to the mounting of an LCD in a mobile phone. This allows the user to have several displays of differing colours and layouts driven from a common driver circuit and battery.

The sprung band 14 also contains touch sensitive buttons (not shown). These are used to control the functions of the watch such as setting the time. Buttons may also be included which alter the display properties of the band, for example to increase luminescence or to change a decorative pattern on the watch.

It will be appreciated that the display must be flexible. In addition to electroluminescent displays, other forms of flexible display may be used such as organic light emitting diode, light emitting polymer, and organic liquid crystal display.

Figure 2:
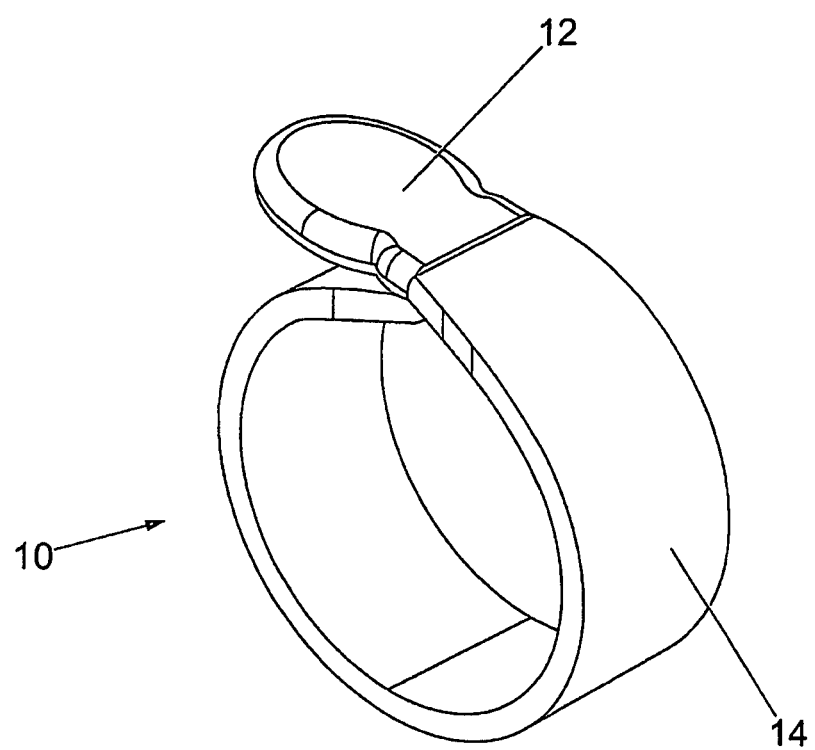
FIG. 2 is a perspective view of the apparatus of FIG. 1 in which the apparatus has been moulded into a loop.

In use the watch 10 is placed over the wearer's wrist in its initial flat form. The wearer then applies pressure to the ends of the watch 10. The sprung band 14 yields to the pressure and moulds around the wearer's wrist as described above. Once a desired fit is attained, the wearer discontinues the application of pressure. The watch 10 is left in a moulded position around the wearer's wrist. The watch 10 in this form can be seen more clearly in FIG. 2.

The watch 10 does not require any latch mechanism to hold it in this position, as the malleability of the sprung display band 14 retains it around the wearer's wrist until the wearer wishes to remove it.

Since the watch 10 has a malleable property, it can be readily moulded into a number of shapes or sizes. Standard lengths of display bands 14 can fit a variety of wearers with differing wrist sizes. Alternatively a single wearer can deploy the watch on another limb; the leg for example.

Since the control unit 12 and display band 14 are interchangeable, the wearer can alternate shapes and designs of display band to suit mood or occasion.

Figure 4:
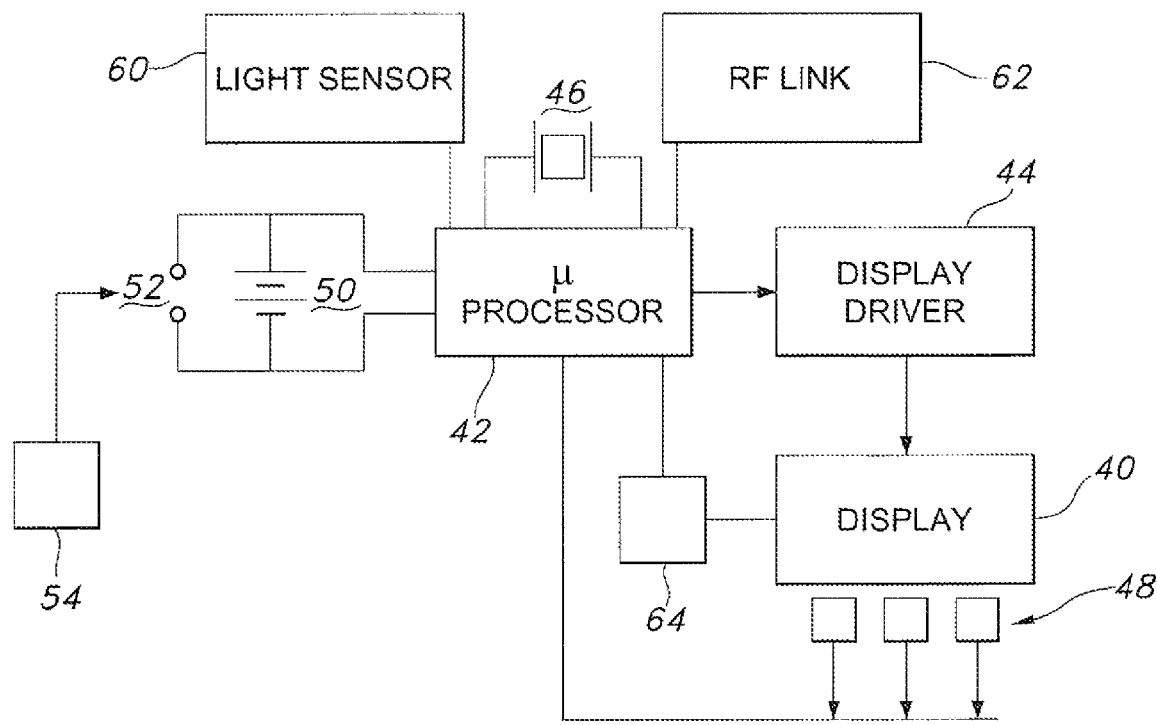
FIG. 4 is a schematic of an alternative circuit arrangement.

FIG. 4 illustrates a more sophisticated control arrangement. In FIG. 4, a display 40 is controlled by a microprocessor 42 via a display driver circuit 44. For use as a watch, accurate time reference is given by a reference crystal 46. Control inputs to the microprocessor 42 are provided by touch-sensitive inputs 48. The apparatus is powered by a battery 50, which is preferably a rechargeable battery (most suitably using lithium ion technology) which can be recharged via power inputs 52, or by an inductive arrangement. For example, recharging could be by an existing cell phone charger (see box 54) via a suitable adaptor.

Alternatively, the battery 50 may be recharged by a solar cell (box 54) or by a thermoelectric cell (same) using the body heat of the wearer. As a further alternative, a lithium ion polymer battery could be used; since these are conformable, the battery 50 could be included in the wrist strap rather than the control unit.

Power consumption may be reduced by providing a light sensor 60 and controlling the display illumination in accordance with ambient light.

The example of FIG. 4 is suited for use where the display 40 is in the form of a pixel array. In this case, the display can be controlled to display the time together with fixed or dynamic graphics, which may be pictorial or abstract, and monochrome or colour. Also, since the arrangement of FIG. 4 is microprocessor based, it would be simple to include a radio frequency link 62, for example using Bluetooth technology, and to use the control inputs 48 for remote control of other devices.

A number of modifications are envisaged without departing from the scope of the invention.

The invention may be provided as an item of adornment only, not containing a time displaying function. The invention could therefore display an attractive design for aesthetic purposes only. This design could also be changeable via the control unit alternating between several designs.

The invention may include means to program the device to alternate the displayed design at a set frequency, or to strobe or produce other interesting or eye-catching effects.

Figure 1A:
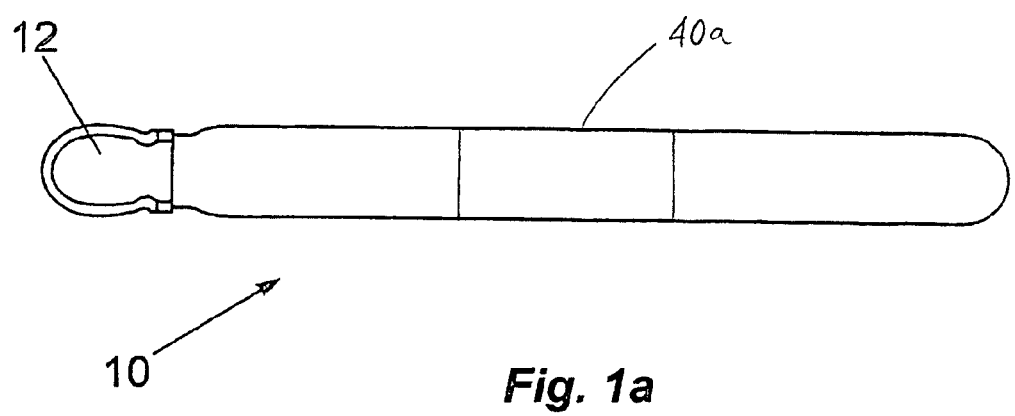
FIGS. 1a and 1b present front and rear plan views of one embodiment of the display apparatus of the present invention.
Figure 1B:
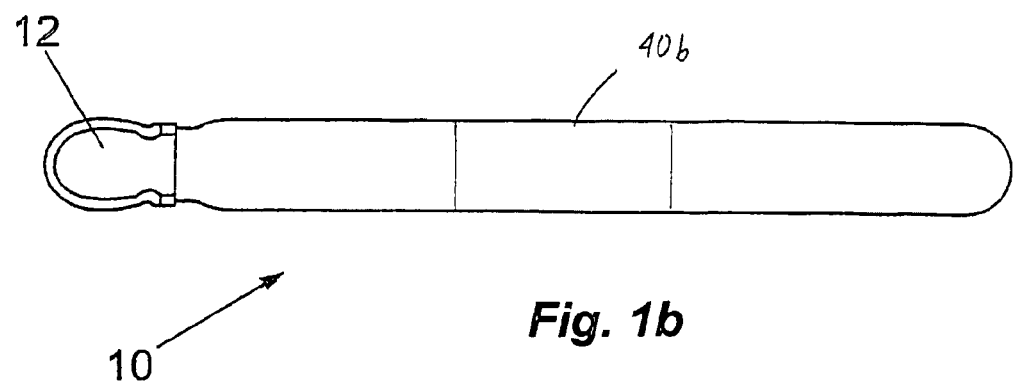

All this can be separate from or in conjunction with a display of the time. As can be understood from FIGS. 1a and 1b, the apparatus may be double sided, such that it can be wrapped around the wrist in either direction. One side might then display the time and the other side a graphic display (note displays 40a and 40b). Either side or both may be animated.

The apparatus may include an external plastic casing enclosing the whole apparatus. Furthermore, the invention may include a sound sensor 64 linked to the display feature. Therefore if the invention is exposed to a sound source, for example if the wearer is in a nightclub, the invention would provide an attractive display which flashes or illuminates selectively in response to the tempo of the music.

Although it is preferred to have the display band readily detachable from the control unit, it would be possible to mount the control circuitry directly onto the display substrate, possibly but not necessarily a rigid portion.

What is claimed:

1. A display apparatus comprising a flexible display member comprising a flexible electronic pixel array and a removable control unit that houses electronics that drive and control the flexible electronic pixel array, the display member being in the form of a strip or a band of thin metal or plastic which is initially axially straight and transversely concave and of a size suitable to be positioned around a limb of a user and extending along the entire length of the strip or band, in which the display member is removably attached to the control unit by a male/female connector arrangement, in which a male portion is inserted into a female portion to form the connection in a temporary manner without the use of a screw or pin and such that the display member and control unit may be separated from each other by a sliding movement, and wherein the display member can be easily and efficiently detached from the control unit and replaced with an alternative design or size display member to suit the user.

2. A display apparatus according to claim 1, in which the display member is sufficiently stiff as to retain its shape without the need for a latch or other retainer.

3. A display apparatus according to claim 1, in which the display member comprises an electro-luminescent, organic light emitting diode, light emitting polymer, or organic liquid crystal display bonded to a strip.

4. A display apparatus according to claim 3, in which the display member comprises a rubber backing, a strip of thin steel forming said strip, said electro-luminescent, organic light emitting diode, light emitting polymer, or organic liquid crystal display, a filter layer, and an anti-moisture covering.

5. A display apparatus according to claim 1, in which the control unit is releasably secured to a distal portion of the display member.

6. A display apparatus according to claim 1, in which controls are provided on the display member or on the control unit.

7. A display apparatus according to claim 6, in which said controls are in the form of touch-sensitive areas.

8. A display apparatus according to claim 1, in which the control unit comprises means for generating visual patterns on the display member, whereby the apparatus functions as an electronic bracelet.

9. A display apparatus according to claim 1, in which the control unit comprises a timing circuit and the display member is adapted to display time indicia, whereby the apparatus functions as a watch.

10. A display apparatus according to claim 1, further including a sound sensor.

11. A display apparatus according to claim 1, in which the flexible electronic pixel array is provided on one side of the display member and a display is provided on an opposite side of the display member.

12. A display apparatus according to claim 1, wherein the display member comprises a battery separate from the control unit.

13. A display apparatus according to claim 1, further including a light sensor for controlling illumination of the flexible pixel array in accordance with ambient light.

14. A display apparatus according to claim 1, wherein the control unit includes a radio frequency link for remote control of a device.

15. A display apparatus according to claim 1, further including a battery recharged by a solar cell or a thermoelectric cell.

16. The apparatus of claim 1, wherein the female portion comprises a recess formed by the concurrence of an upper housing portion and a lower housing portion of the control unit, said upper and lower housing containing a controller for controlling the flexible electronic pixel array.

17. The apparatus of claim 16, wherein the male portion comprises a tongue adapted for positioning in the cavity.

18. The apparatus of claim 1, further including a sleeve for at least partially covering the male portion of the connection.

19. A display apparatus comprising a flexible display member comprising a flexible electronic pixel array and a removable control unit provided at one end of the display member that houses electronics that drive and control the flexible electronic pixel array, the display member being in the form of a strip or a band of thin metal or plastic which is initially axially straight and transversely concave and of a size suitable to be positioned around a limb of a user and extending along the entire length of the strip or band, in which the display member is removably attached to the control unit by a male/female connector arrangement in which a male portion is inserted into a female portion to form the connection in a temporary manner without the use of a screw or in and such that the display member and control unit may be separated from each other by a sliding movement and replaced with an alternative design or size display member to suit the user.

20. A display apparatus according to claim 19, in which the display member is sufficiently stiff as to retain its shape without the need for a latch or other retainer.

21. A display apparatus according to claim 19, in which the display member comprises an electro-luminescent, organic light emitting diode, light emitting polymer, or organic liquid crystal display bonded to a strip.

22. A display apparatus according to claim 21, in which the display member comprises a rubber backing, a strip of thin steel forming said strip, said electro-luminescent, organic light emitting diode, light emitting polymer, or organic liquid crystal display, a filter layer, and an anti-moisture covering.

23. A display apparatus according to claim 19, in which controls are provided on the display member or on the control unit.

24. A display apparatus according to claim 23, in which said controls are in the form of touch-sensitive areas.

25. A display apparatus according to claim 19, in which the control unit comprises a timing circuit and the display member is adapted to display time indicia, whereby the apparatus functions as a watch.

26. A display apparatus according to claim 19, in which the control unit comprises means for generating visual patterns on the display member, whereby the apparatus functions as an electronic bracelet.

27. A display apparatus according to claim 19, further including a sound sensor.

28. A display apparatus according to claim 19, in which the flexible electronic pixel array is provided on one side of the display member and a display is provided on an opposite side of the display member.

29. A display apparatus according to claim 19, wherein the display member comprises a battery separate from the control unit.

30. A display apparatus according to claim 19, further including a light sensor for controlling illumination of the flexible pixel array in accordance with ambient light.

31. A display apparatus according to claim 19, wherein the control unit includes a radio frequency link for remote control of a device.

32. A display apparatus according to claim 19, further including a battery recharged by a solar cell or a thermoelectric cell.

\* \* \* \* \*

UNITED STATES PATENT AND TRADEMARK OFFICE
CERTIFICATE OF CORRECTION

PATENT NO. : 8,482,909 B2  
APPLICATION NO. : 12/426451  
DATED : July 9, 2013  
INVENTOR(S) : Douglas Page 1 of 1

It is certified that error appears in the above-identified patent and that said Letters Patent is hereby corrected as shown below:

In the Claims:

Column 5, line 45, please replace "in" with -- pin --.

Signed and Sealed this
Twenty-ninth Day of October, 2013

Teresa Stanek Rea
*Deputy Director of the United States Patent and Trademark Office*